(12) United States Patent
Tai et al.

(10) Patent No.: US 6,341,040 B1
(45) Date of Patent: Jan. 22, 2002

(54) MULTI-PLATE COMB FILTER AND APPLICATIONS THEREFOR

(75) Inventors: Kuochou Tai, Fremont, CA (US); Bo Cai, Herts (GB)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/328,037

(22) Filed: Jun. 8, 1999

(51) Int. Cl.$^7$ ............................. G02B 5/28; H04J 14/02
(52) U.S. Cl. ....................... 359/584; 359/577; 359/589; 359/124
(58) Field of Search ................................. 359/589, 590, 359/585, 584, 588, 577, 359, 360, 124, 127; 356/352

(56) References Cited

U.S. PATENT DOCUMENTS

| | | | | |
|---|---|---|---|---|
| 3,504,959 A | * | 4/1970 | Hennessey | 359/590 |
| 3,556,640 A | * | 1/1971 | Austin | 359/585 |
| 4,158,133 A | * | 6/1979 | Spaeth et al. | 359/590 |
| 4,282,290 A | * | 8/1981 | Pellicori et al. | 359/359 |
| 4,464,022 A | | 8/1984 | Emkey | |
| 4,707,064 A | * | 11/1987 | Dobrowolski et al. | 359/589 |
| 4,735,478 A | * | 4/1988 | Hily et al. | 385/33 |
| 4,799,745 A | * | 1/1989 | Meyer et al. | 359/360 |
| 4,806,750 A | * | 2/1989 | Vincent | 359/589 |
| 4,813,756 A | * | 3/1989 | Frenkel et al. | 359/124 |
| 5,170,290 A | * | 12/1992 | Land et al. | 359/589 |
| 5,204,771 A | | 4/1993 | Koga | 359/281 |
| 5,233,464 A | * | 8/1993 | Costich | 359/589 |
| 5,287,214 A | * | 2/1994 | Robertson et al. | 359/578 |
| 5,471,340 A | | 11/1995 | Cheng et al. | 359/281 |
| 5,629,995 A | * | 5/1997 | Duck et al. | 385/34 |
| 5,646,781 A | * | 7/1997 | Johnson, Jr. | 359/588 |
| 5,694,233 A | | 12/1997 | Wu et al. | 359/117 |
| 5,825,792 A | * | 10/1998 | Velleneuve et al. | 372/32 |
| 5,844,734 A | * | 12/1998 | Sharp et al. | 359/589 |
| 5,867,291 A | | 2/1999 | Wu et al. | 359/124 |
| 5,930,039 A | | 7/1999 | Li et al. | 359/484 |
| 6,031,653 A | * | 2/2000 | Wang | 359/589 |
| 6,208,442 B1 | * | 3/2001 | Liu et al. | 359/127 |
| 6,215,592 B1 | * | 4/2001 | Pelekhaty | 359/589 |

OTHER PUBLICATIONS

Optics & Filters, ORIEL Corporation catalog, vol. III, p. 2–29, Dec. 1992.*
A. Frenkel, et al., "Angle–Tuned Etalon Filters for Optical Channel Selection in High Density Wavelength Division Multiplexed Systems", J. Lightwave Technology, vol. 7, No. 4, pp. 615–624, Apr. 1989.*
A.A.M. Saleh, et al., "Two–Stage Fabry–Perot Filters as Demultiplexers in Optical FDMA LAN's", J. Lightwave Technology, vol. 7, No. 2, pp. 323–330, Feb. 1989.*
H. van de Stadt, et al., "Multimirror Fabry–Perot interferometers", J. Optical Society of America A, vol. 2, No. 8, pp. 1363–1370, Aug. 1985.*
R. E. Loughhead, et al., "Instrument Profile of a Triple Fabry–Perot Interferometer for use in Solar Spectroscopy", Applied Optics, vol. 17, No. 3, pp. 415–419, Feb. 1978.*

(List continued on next page.)

*Primary Examiner*—Cassandra Spyrou
*Assistant Examiner*—John Juba, Jr.
(74) *Attorney, Agent, or Firm*—Lacasse & Associates; Randy W. Lacasse; Kevin E. Greene

(57) ABSTRACT

Methods and apparatuses for filtering optical channels to provide, for example, an interleaver, or a deinterleaver. A multi-plate comb filter is used to separate subsets of channels and for mixing subsets of channels. Interleavers and deinterleavers having one or more multi-plate comb filters can be used to increase the bandwidth of an optical network. The interleavers and deinterleavers can be used to interface components designed for a first channel spacing to components designed for a second channel spacing.

13 Claims, 16 Drawing Sheets

OTHER PUBLICATIONS

E. O. Ammann, "Synthesis of Electro–Optic Shutters having a Prescribed Transmission vs Voltage Characteristic", Journal of the Optical Society of America, Aug. 1966, pp. 1081–1088, vol. 56, No. 8, USA.

S.E. Harris, E.O. Ammann & I.C. Chang, "Optical Network Synthesis Using Birefringent Crystals", Journal of the Optical Society of America, Oct. 1964, pp. 1267–1279, vol. 54, No. 10, USA.

Amnon Yariv & Pochi Yeh, "Jones Calculus and its Application to Birefringent Optical Systems", Optical Waves in Crystals, 1984, pp. 121–154, John Wiley & Sons, Inc., Canada.

"Properties of a Novel Noncascaed Type, Easy–to–Design, Ripple–Free Optical Bandpass Filter," Benamin B. Dingel, et al., Journal of Lightwave Technology, vol. 17, No. 8, Aug. 1999, pp. 1461–1469.

"Multifunction optical filter with a Michelson–Gires–Tournois interferometer for wavelength–division–multiplexed network system applications," Benjamin B. Dingel, et al., Optics Letters, vol. 23, No. 14, Jul. 15, 1998, pp. 1099–1101.

* cited by examiner

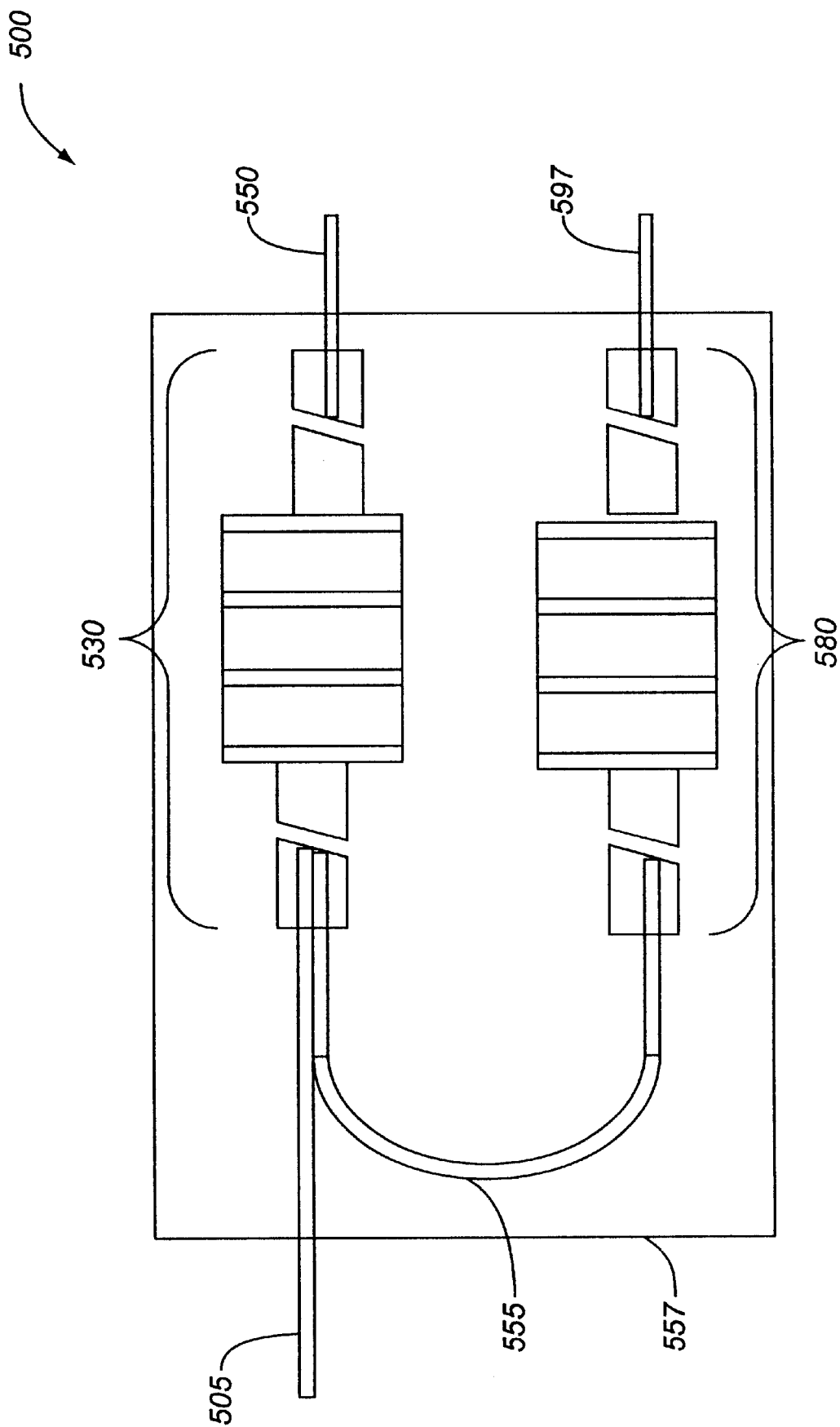

MULTI-PLATE COMB FILTER AND APPLICATIONS THEREFOR

FIELD OF THE INVENTION

The invention relates to optical data communications devices. More particularly, the invention relates to a multi-plate optical comb filter and devices (e.g., a deinterleaver, an interleaver), having, a multi-plate optical comb filter.

BACKGROUND OF THE INVENTION

As telecommunications usage increases as a result of, for example, increased Internet usage, increased types of communications, population growth, etc., telecommunications providers are required to provide greater voice- and data-carrying, capacity. In order to reduce cost and the amount of time required to provide the increased capacity wavelength division multiplexing (WDM) and dense wavelength division multiplexing (DWDM) have been developed, which provide increased capacity without requiring new fiber optic cables.

WDM and DWDM technologies combines multiple optical signals into a single fiber by transporting each signal on a different optical wavelength or channel. Multiplexing and demultiplexing, of optical channels is typically accomplished with thin film optical filters. However, multiple layers of film are required to multiplex and demultiplex multiple channels, which increases the cost and complexity of a component. Another disadvantage of multiple layers of thin film for filtering is that the thin films break down over time, especially when operating under high power conditions.

What is needed is an improved optical filter that can be used for multiplexing and demultiplexing, optical signals.

SUMMARY OF THE INVENTION

Multi-plate optical filters and applications therefor are described. In one embodiment, a multi-plate optical filter includes a set of glass plates that are placed immediately adjacent to one another with a partially reflective material between each of the pairs of plates to form a glass plate structure. A partially reflective material is also included on the front and the back of the glass plate structure. The multi-plate filter can have three, four, five, or more glass plates.

In an alternate embodiment, one or more multi-plate optical filters are included in an optical signal deinterleaver to separate a set of optical signals into two or more subsets of optical signals. In another embodiment, one or more multi-plate optical filters are included in an optical signal interleaver to combine two or more subsets of optical signals into a single set of optical signals.

BRIEF DESCRIPTION OF THE DRAWINGS

The invention is illustrated by way of example, and not by way of limitation in the figures of the accompanying drawings in which like reference numerals refer to similar elements.

FIG. 5 illustrates on embodiment of an optical deinterleaver having a three-plate optical comb filter.

DETAILED DESCRIPTION

Optical comb filters and applications of such filters are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention include methods and apparatuses for filtering optical channels to provide, for example, an interleaver or a deinterleaver. A multi-plate comb filter is used to separate subsets of channels and for mixing subsets of channels. Interleavers and deinterleavers having one or more multi-plate comb filters can be used to increase the bandwidth of an optical network. The interleavers and deinterleavers can be used to interface components designed for a first channel spacing to components designed for a second channel spacing.

Figure 1:
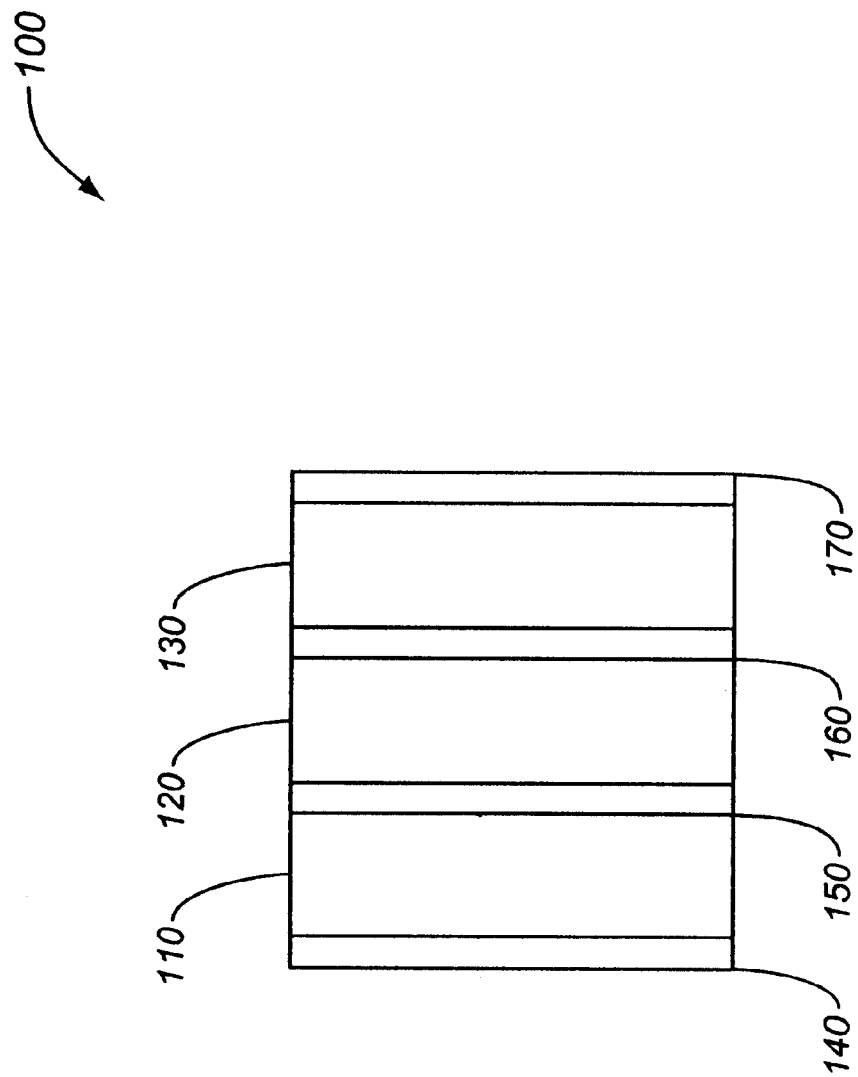
FIG. 1 illustrates one embodiment of a three-plate optical comb.

FIG. 1 illustrates one embodiment of a three-plate optical comb. In order to provide filtering that is sufficiently accurate to provide comb filtering functionality for International Telecommunications Union (ITU) channel spacing, the thickness of each glass plate should be consistent within a predetermined tolerance. In one embodiment the thickness tolerance for each plate is 1.0 $\mu$m; however, other tolerances can also be used.

In general, comb filter 100 includes glass plates 110, 120 and 130. Comb filter 100 also includes reflective coatings/materials 140, 150, 160 and 170. In one embodiment, the components of comb filter 100 are held in optical contact by atomic force rather than epoxy; however, epoxy can also be used. Because of the flatness of the components of comb filter 100, by abutting the components to each other, contact is maintained by atomic forces.

In one embodiment, glass plates 110, 120 and 130 are 0.5 mm thick for 100 GHz spaced input signals, 1.0 mm thick for 50 GHz spaced input signals, and 0.25 mm thick for 200 GHz spaced input signals. Other plate thicknesses can be used, for example, for other input signal spacings.

In one embodiment, reflective coatings/materials 140 and 170 have approximately the same reflectivity and reflective coatings/materials 150 and 160 have approximately the same reflectivity that is different than the reflectivity of coatings/materials 140 and 170. In one embodiment, the reflectivity of coatings/materials 140 and 170 is in the range of 20% to 30% reflective, and the reflectivity of coatings/materials 150 and 160 is in the range of 60% to 70% reflective. Other reflectivities can also be used.

Figure 2:
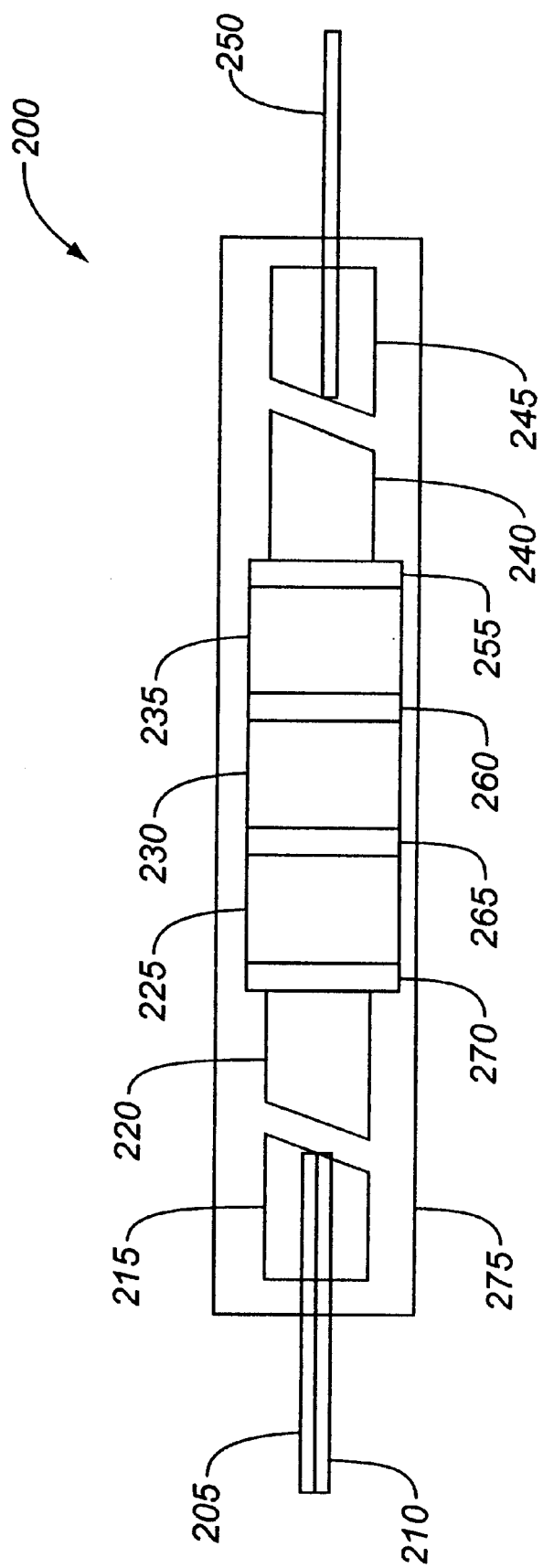
FIG. 2 illustrates one embodiment of a device having a three-plate optical comb filter.

FIG. 2 illustrates one embodiment of a device having a three-plate optical comb filter. Filter component 200 receives a set of input signals via optical fiber 205. In one embodiment, the input signals are multiple channels adhearing to the ITU standard fiber optic telecommunications channels. Other sets of input signals can also be used. Filter component 200 can also include filters having a different number of glass plates (e.g., 2, 4, 5).

Optical fiber 205 is connected to fiber seat 215, which receives two optical fibers (e.g., 205 and 210). The light carried by optical fiber 205 is collimated by gradient index (GRIN) lens 220. Other types of lenses can also be used.

The light output from GRIN lens 220 is directed to thin film material 270. In one embodiment, thin film material 270 is made of $Nb_2O_5$ or $Ta_2O_5$ and has a reflectivity in the range of 20% to 30% reflective (e.g., 25%); however, other materials and reflectivities can also be used. Thus, thin film material 270 reflects 20% to 30% of the optical signal(s) output from GRIN lens 220 and outputs 70% to 80% of the optical signal(s) toward glass plate 225.

The optical signal(s) are transmitted through thin film material 270 and through glass plate 225 to thin film material 265. In one embodiment, thin film material 265 is made of $Nb_2O_5/SiO_2$ or $Ta_2O_5/SiO_2$; however, other materials can also be used. In one embodiment, thin film material 265 has a reflectivity in the range of 60% to 70% reflective (e.g., 65%); however, other materials and reflectivities can also be used.

The optical signal(s) are transmitted by thin film material 265 travel through glass plate 230 to thin film material 260. In one embodiment, thin film material 260 is the same material and has the same reflectivity as thin film material 265; however, thin film material 260 and thin film material 265 are not required to be the same material and have the same reflectivity.

The optical signal(s) that are transmitted by thin film material 260 travel through glass plate 235 to thin film material 255. In one embodiment, thin film material 255 is the same material and has the same reflectivity as thin film material 270; however, thin film material 270 and thin film material 255 are not required to be the same material and have the same reflectivity.

The optical signal(s) that are transmitted through thin film material 255 are input to GRIN lens 240 and focused on optical fiber 250 that is connected to fiber seat 245. The optical signal(s) that are reflected by thin film materials 255, 260, 265 and 270 are focused by GRIN lens 270 on optical fiber 210.

In one embodiment, glass plates 225, 230 and 235 are polished glass plates have a thickness that is constant within a small tolerance. In one embodiment, the tolerance is 1 $\mu$m; however, other tolerance values can be used. In one embodiment, glass plates 225, 230 and 235 are polished to $\lambda/10$ in flatness and <5 nm in roughness; however, other flatness and roughness parameters can also be used. As described above, thin film materials 270, 265, 260 and 255 are made of, for example, $Nb_2O_5$ and $SiO_2$. Because of the smoothness of glass plates 225, 230 and 235, the comb filter components can be bound together without epoxy. By abutting the thin film materials to the glass plates or the glass plates to each other, the various components can be bound by atomic forces sufficiently to operate as an optical component.

In one embodiment, filter component 200 can be tuned by modifying the angle of optical fibers 205, 210 and 250. By allowing a small angle of adjustment (e.g., 1°–2°), the elements of filter component 200 can be tuned after filter component 200 is assembled.

In one embodiment, filter component 200 receives multiple optical channels (e.g., Channel 1, Channel 2, Channel 3, Channel 4 and Channel 5) through optical fiber 205. The even channels (e.g., Channel 2 and Channel 4) are reflected by the filter elements (thin film materials 255, 260, 265 and 270, and glass plates 225, 230 and 235) to optical fiber 210. The odd channels (e.g., Channel 1, Channel 3 and Channel 5 ) are passed by the filter elements to optical fiber 250. In an alternative embodiment, the odd channels are reflected to optical fiber 210 and the even channels are passed to optical fiber 250.

Figure 3A:
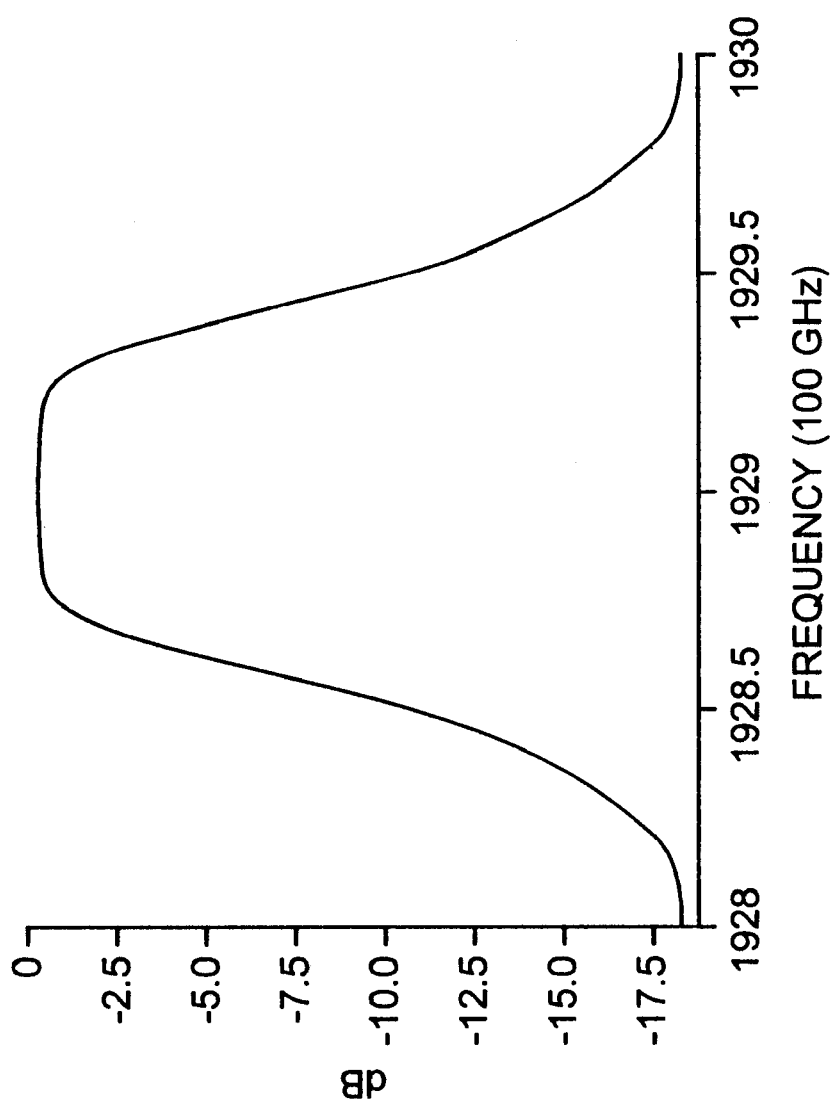
FIGS. 3a–3c are logarithmic scale transmission characteristics of an embodiment of a three-plate comb filter having a first set of reflectivity characteristics.
Figure 3B:
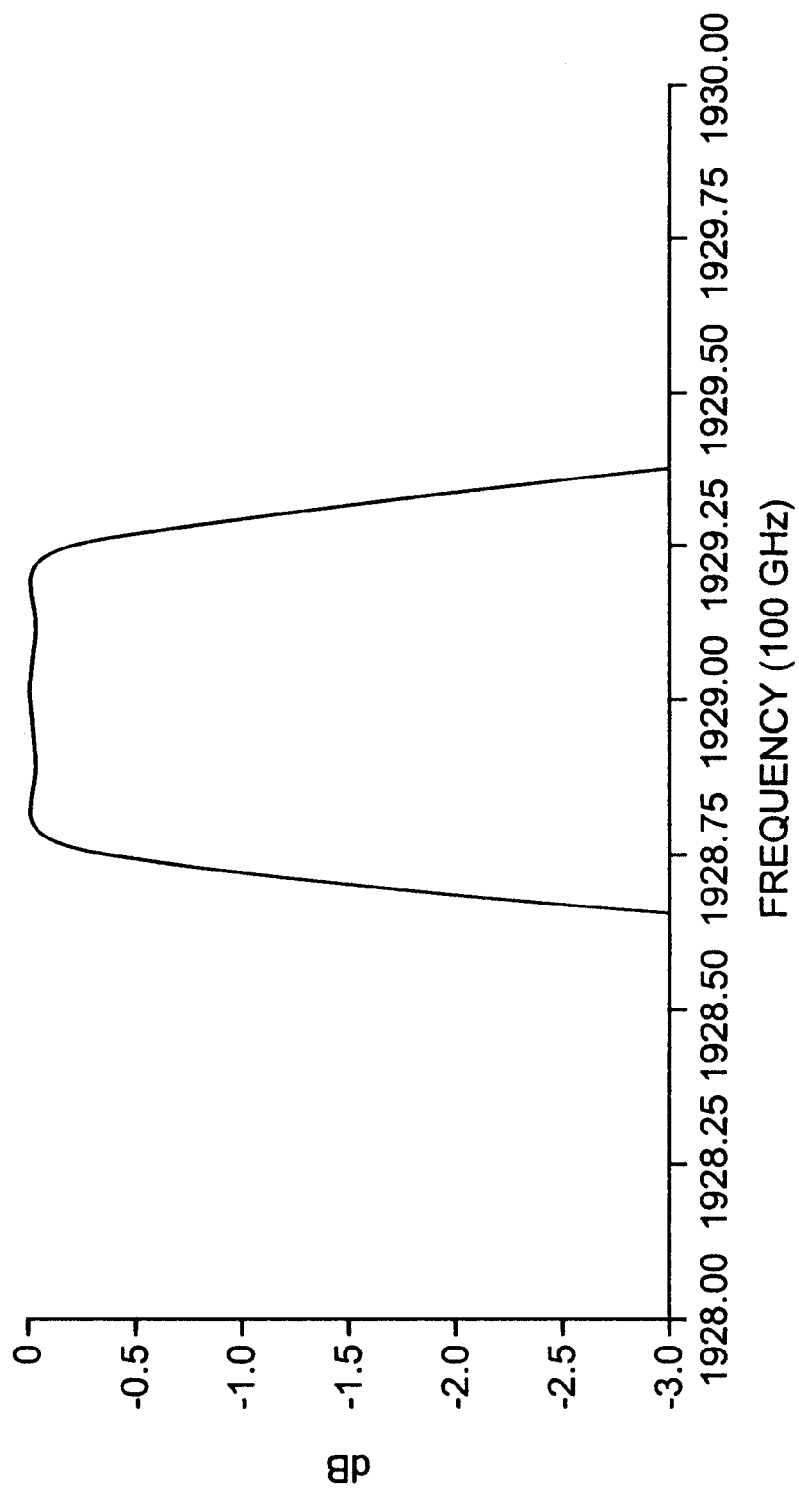
Figure 3C:
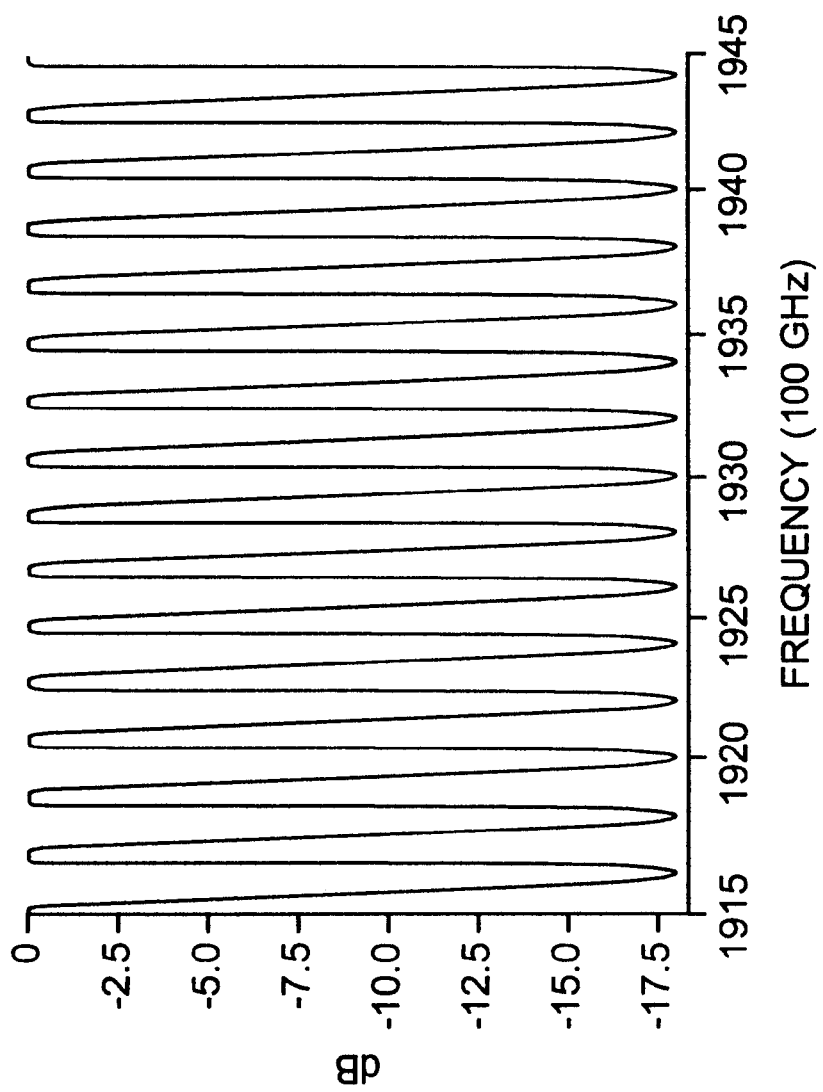

FIGS. 3a–3c are logarithmic scale transmission characteristics of an embodiment of a three-plate comb filter having a first set of reflectivity characteristics. The first set of reflectivity characteristics are 17% reflective for the first reflectivity and 55% reflective for the second reflectivity.

FIG. 3a illustrates the transmission characteristics of a three-plate comb filter having the first set of reflectivity characteristics. The example of FIG. 3a shows the isolation of ITU Channel 29 from Channels 28 and 30. FIG. 3b is a detailed illustration of the transmission characteristics of the three-plate comb filter having the first set of reflectivity characteristics. FIG. 3c illustrates the transmission characteristics of a three-plate comb filter having the first set of reflectivity characteristics for ITU Channels 15 through 45.

Figure 4A:
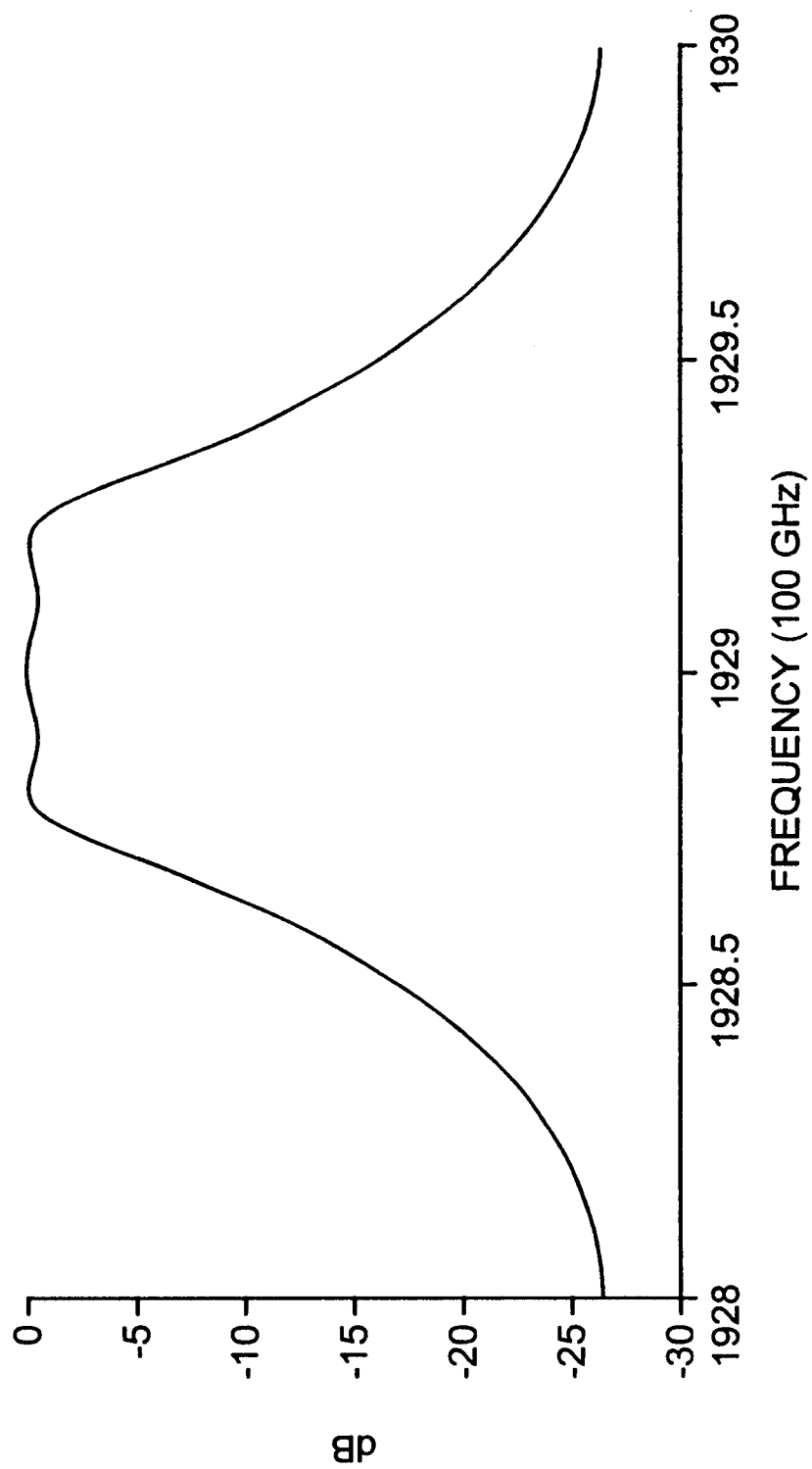
FIGS. 4a–4c are logarithmic scale transmission characteristics of an embodiment three-plate comb filter having a second set of reflectivity characteristics.
Figure 4B:
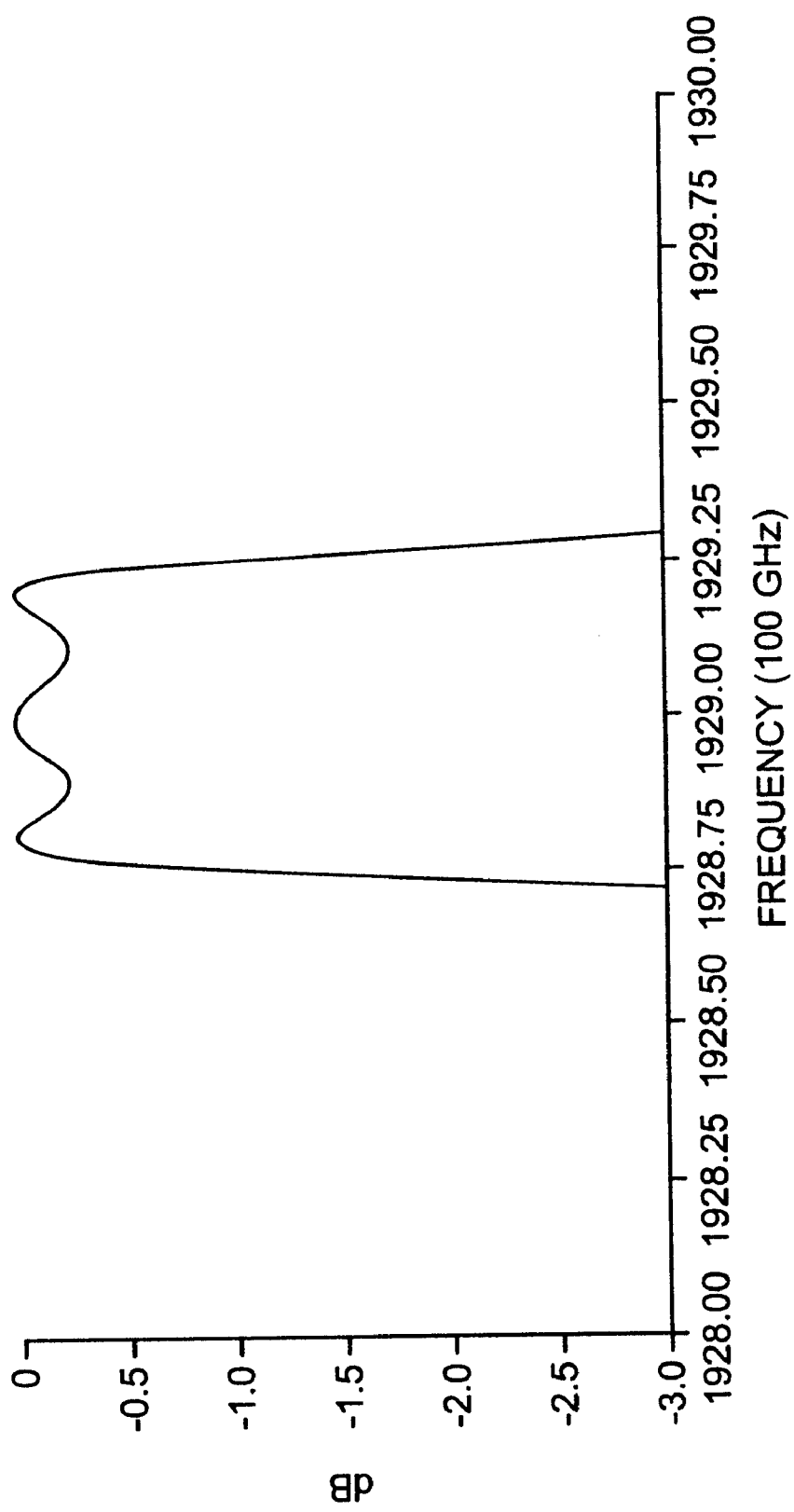
Figure 4C:
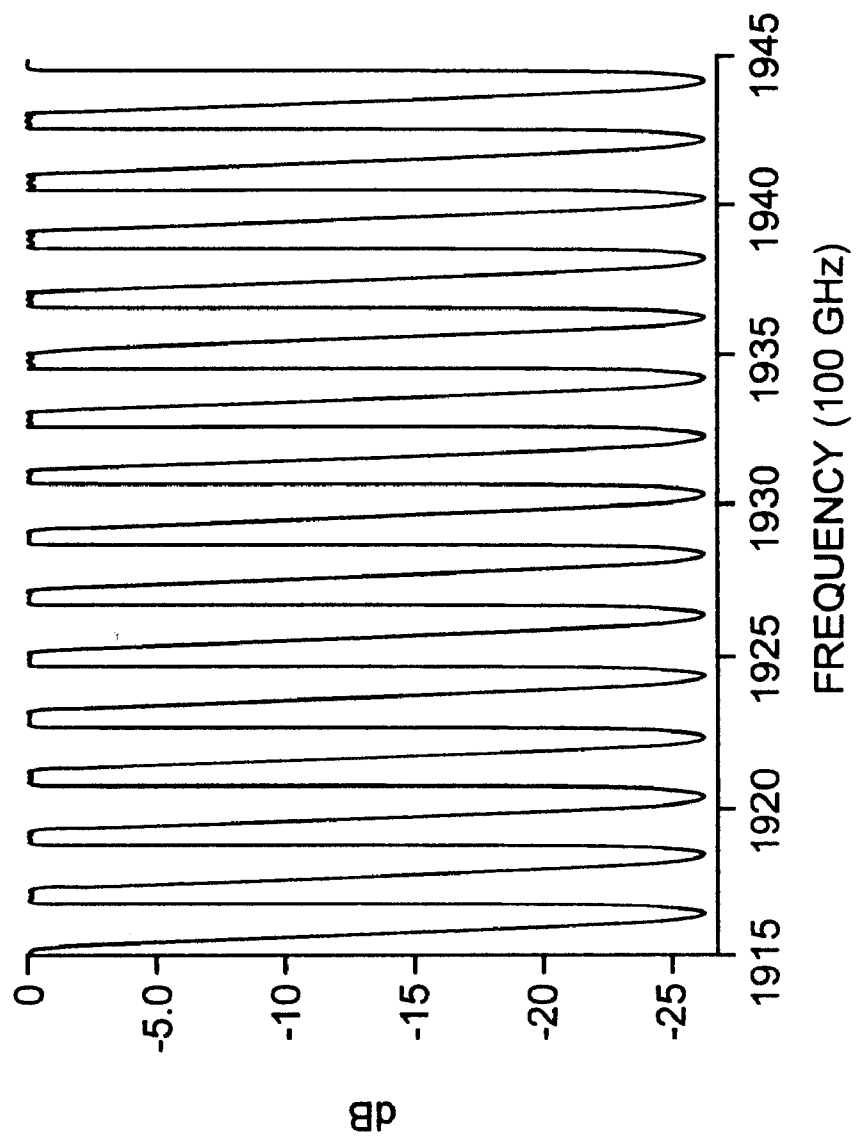

FIGS. 4a–4c are logarithmic scale transmission characteristics of an embodiment of a three-plate comb filter having a second set of reflectivity characteristics. The second set of reflectivity characteristics are 30% reflective for the first reflectivity and 70% reflective for the second reflectivity.

FIG. 4a illustrates the transmission characteristics of a three-plate comb filter having the second set of reflectivity characteristics. The example of FIG. 4a shows the isolation of ITU Channel 29 from Channels 28 and 30. FIG. 4b is a detailed illustration of the transmission characteristics of the three-plate comb filter having the second set of reflectivity characteristics. FIG. 4c illustrates the transmission characteristics of a three-plate comb filter having the second set of reflectivity characteristics for ITU Channels 15 through 45.

FIG. 5 illustrates on embodiment of an optical deinterleaver having a three-plate optical comb filter. Deinterleaver 500 generally includes two comb filters to separate the odd and the even channels from a set of channels received. In one embodiment, the elements of deinterleaver 500 are housed in package 557. In an alternative embodiment, the elements of deinterleaver 500 are discrete components.

In the embodiment, three-plate comb filter 530 operates to filter the optical signals as described above. Three-plate comb filter 580 operates to further filter the signals reflected by three-plate comb filter 530. As described in greater detail below, increasing the number of plates in a comb filter provides improved filtering. Thus, for an interleaver with comb filters having four or five plates, a second comb filter may not be necessary.

Optical fiber 505 communicates optical signals (e.g., ITU Channels 15–72) from an external source (not shown in FIG. 5) to interleaver 500. Three-plate comb filter 530 passes the odd channels and reflects the even channels. The odd channels are output via optical fiber 550. The even channels are reflected to fiber 555, which are input to three-plate comb filter 580. The even channels are output by optical fiber 597.

Figure 6:
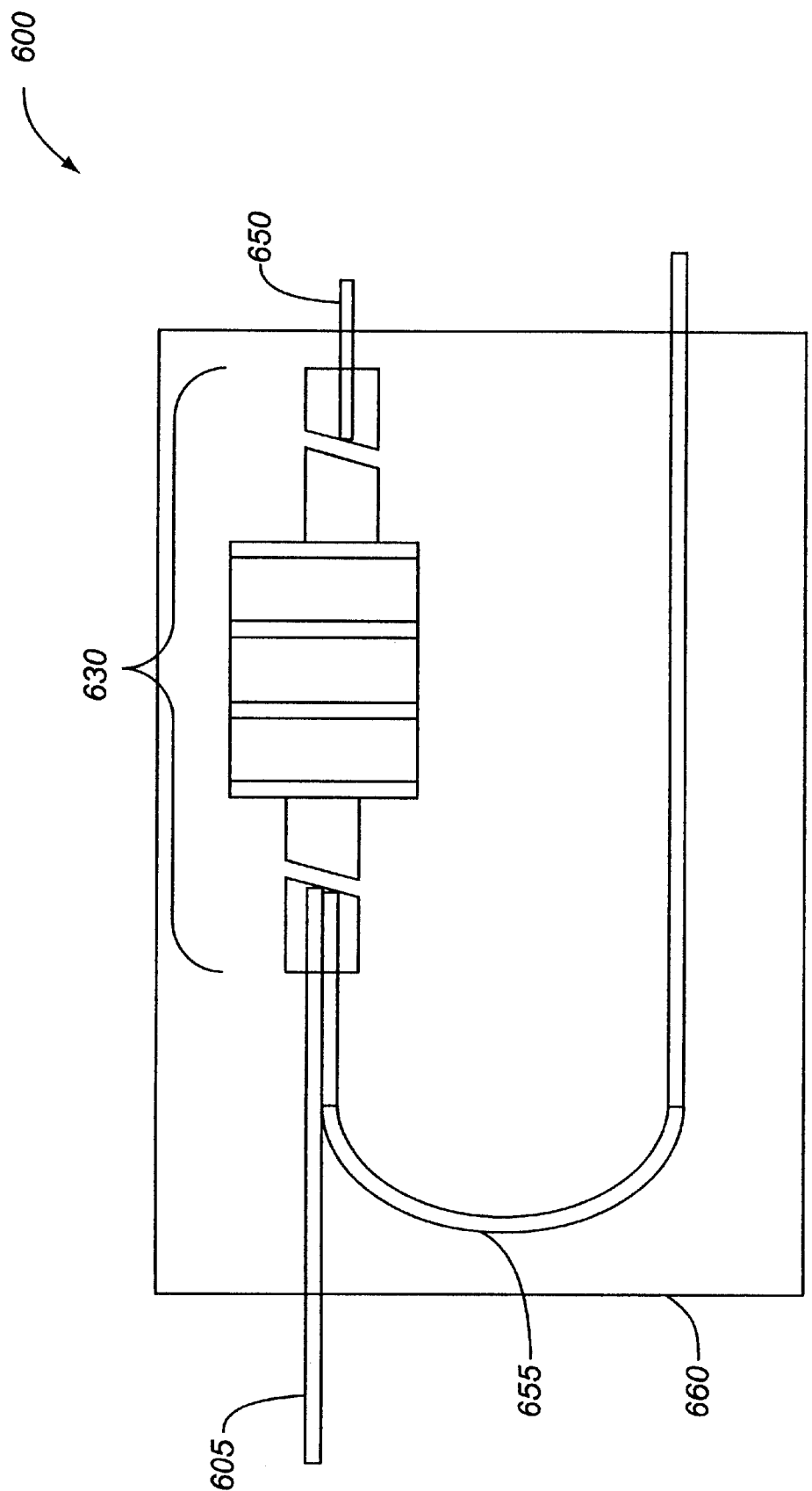
FIG. 6 illustrates one embodiment of an optical interleaver having a three-plate optical comb filter.

FIG. 6 illustrates one embodiment of an optical interleaver having a three-plate optical comb filter. Interleaver 600 operates to combine odd channels and even channels to provide an output signal having both even and odd channels. In one embodiment, the elements of interleaver 600 are housed in package 660; however, one or more of the elements can be discrete components. Interleaver 600 can include optical comb filters having a different number (e.g., 2, 4, 5) of glass plates.

In one embodiment, even channels are input to interleaver 600 via optical fiber 605 and odd channels are input to interleaver 600 via optical fiber 650. Three-plate comb filter 630 passes the odd channels and reflects the even channels. The combined even and odd channels are output via optical fiber 655.

Figure 7:
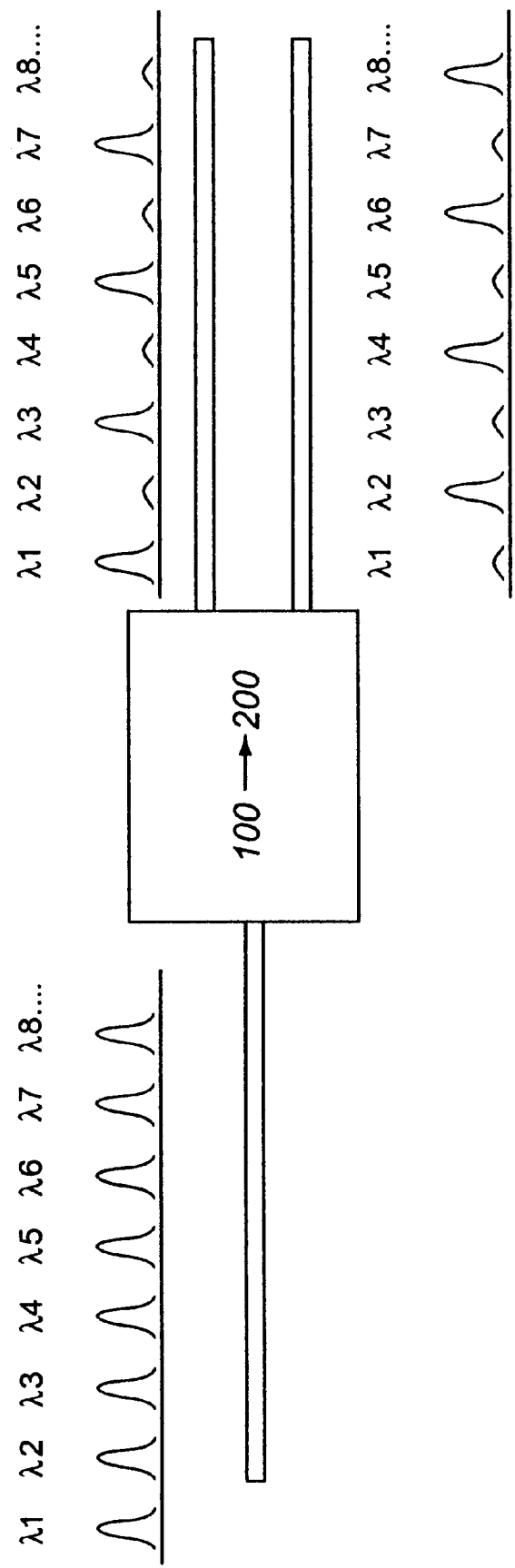
FIG. 7 is a conceptual illustration of a conversion from an optical channel scheme having 100 GHz spacing to an optical channel scheme having 200 GHz.

FIG. 7 is a conceptual illustration of a conversion from an optical channel scheme having 100 GHz spacing to an optical channel scheme having 200 GHz. The conversion of FIG. 7 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 7 is a deinterleaver as described above. After the signals are demultiplxed, the odd channels have a 200 GHz spacing and the even channels have a 200 GHz spacing. Recombining the even and the odd channels can be accomplished with the interleaver described above. The even and odd channels having 200 GHz spacing are combined (interleaved) into a signal stream having 100 GHz signal spacing. Similar interleaving can be provided to convert between 50 GHz spaced channels and 100 GHz spaced channels, as well as between other sets of channel spacing schemes.

Figure 8:
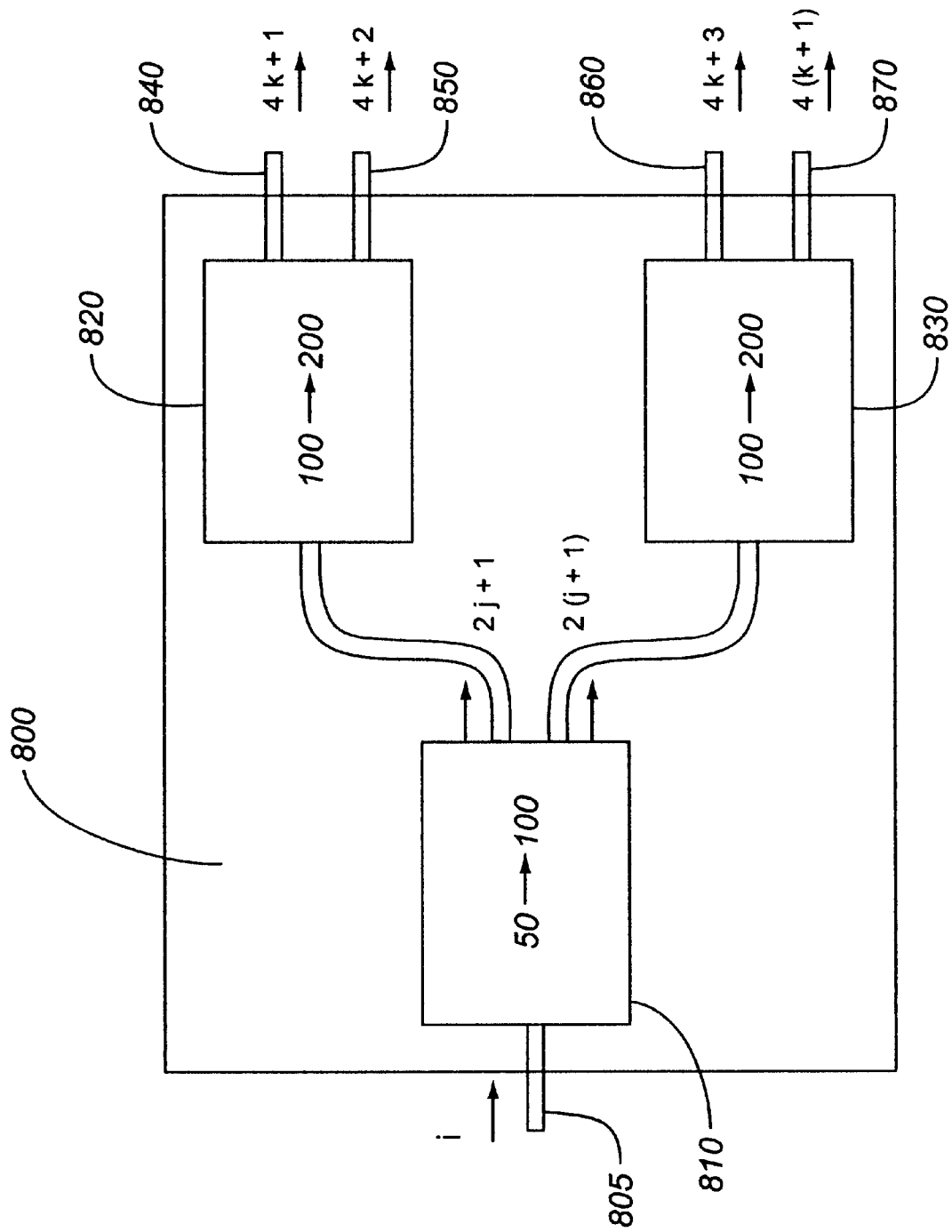
FIG. 8 is a block diagram of an optical deinterleaver for conversion from an optical channel scheme having 50 GHz spacing to an optical channel scheme having 200 GHz spacing.

FIG. 8 is a block diagram of an optical deinterleaver for conversion from an optical channel scheme having 50 GHz spacing to an optical channel scheme having 200 GHz spacing. In general, deinterleaver 800 includes deinterleaver 810 to convert from one set of 50 GHz spaced channels to two sets of 100 GHz spaced channels. Deinterleaver 800 also includes two deinterleavers (820 and 830) each of which convert one of the sets of 100 GHz spaced channels to two sets of 200 GHz spaced channels. Deinterleaver 800 allows devices designed for 200 GHz spaced channels to interact with devices or networks designed for 50 GHz spaced channels.

Optical fiber 805 carries a set of optical channels (i) having 50 GHz spacing. Deinterleaver 810 separates the set of optical channels into sets of even (2(j+1)) and odd (2j+1) channels. The even channels are input to deinterleaver 830 and the odd channels are input deinterleaver 820. The even and the odd channels have 100 GHz spacing.

Deinterleavers 820 and 830 operate to further separate the set of optical channels. Conceptually, deinterleaver 820 and 830 operate on the respective 100 GHz spaced channels to separate the input channels into "even" and "odd" channels. The sets of channels output by deinterleavers 820 and 830 have 200 GHz spacing.

Deinterleaver 820 separates the odd channels into two sets of channels, odd-odd channels (4k+1) output by optical fiber 840 and odd-even (4k+2) channels output by optical fiber 850. Deinterleaver 830 separates the even channels into two sets of channels, the even-odd (4k+3) channels output by optical fiber 860 and the even-even (4(k+1)) channels output by optical fiber 870.

The four sets of channels output by deinterleaver 800 are 200 GHz spaced channels. Thus, deinterleaver 800 can be used to interface one or more devices designed to operate on 200 GHz spaced channels with one or more devices or networks designed to operate on 50 GHz spaced channels. Other channel spacings can also be supported.

Figure 9:
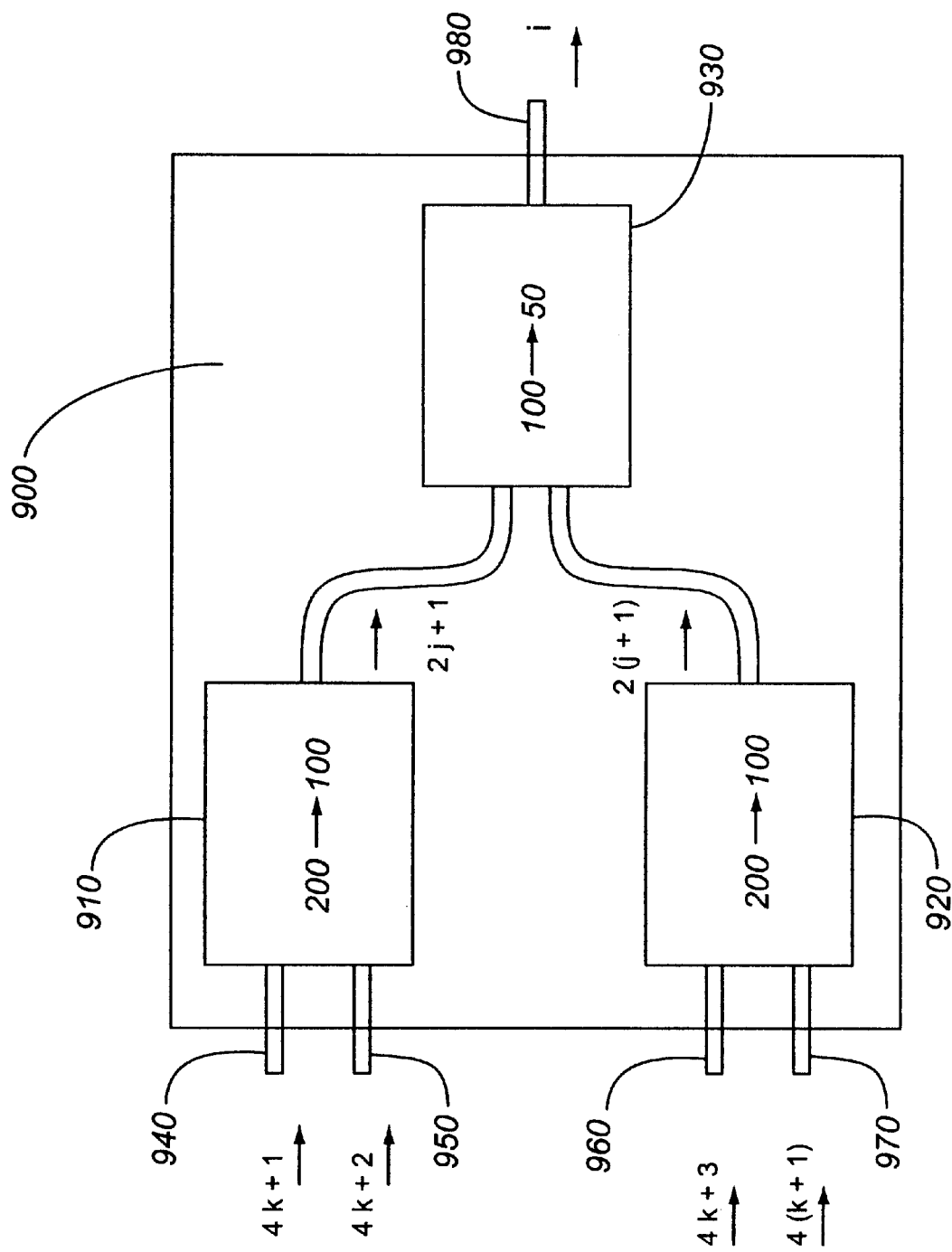
FIG. 9 is a block diagram of an optical interleaver for conversion from an optical channel scheme having 200 GHz spacing to an optical channel scheme having 50 GHz spacing.

FIG. 9 is a block diagram of an optical interleaver for conversion from an optical channel scheme having 200 GHz spacing to an optical channel scheme having 50 GHz spacing. In general, interleaver 900 includes interleaver 910 to convert from two sets of 200 GHz spaced channels to one set of 100 GHz spaced channels. Similarly, interleaver 920 converts from two sets of 200 GHz spaced channels to one set of 100 GHz channels. Interleaver 930 converts the two sets of 100 GHz spaced channels to one set of 50 GHz spaced channels. Interleaver 900 allows devices designed for 200 GHz spaced channels to interact with devices or networks designed for 50 GHz spaced channels.

The odd-odd (4k+1) channels having 200 GHz spacing are input to interleaver 910 via optical fiber 940. The odd-even (4k+2) channels having 200 GHz spacing are input to interleaver 910 via optical fiber 950. Interleaver 910 interleaves the odd-odd channels and the odd-even channels to generate a set of odd (2j+1) channels having 100 GHz spacing.

The even-odd (4k+3) channels having 200 GHz spacing are input to interleaver 920 via optical fiber 960. The even-even (4(k+1)) channels having 200 GHz spacing are input to interleaver 920 via optical fiber 970. Interleaver 920 interleaves the even-odd channels and the even-even channels to generate a set of even (2(j+1)) channels having 100 GHz spacing.

Interleaver 930 interleaves the even and odd channels to generate a set of channels (i) having 50 GHz spacing. Thus, interleaver 900 allows devices designed to operate on optical channels having 200 GHz spacing to interact with devices designed to operate on optical channels having 50 GHz spacing. Other channels spacings can also be supported.

Figure 10:
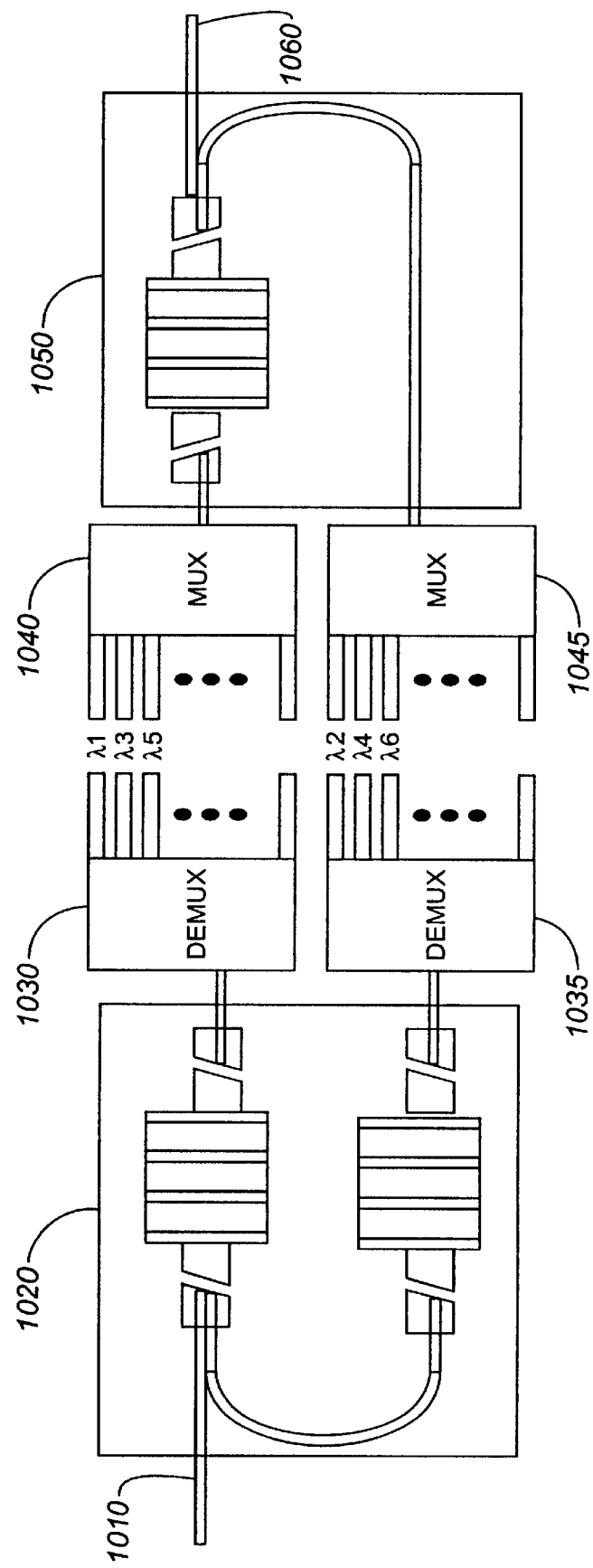
FIG. 10 illustrates one embodiment of an optical component configuration to increase the capacity of optical network.

FIG. 10 illustrates one embodiment of an optical component configuration to increase the capacity of an optical network. While the embodiment of FIG. 10 is described as having a three-plate comb filters and a single layer of interleaving/deinterleaving (e.g., 100 GHz spacing to 200 GHz spacing, 50 GHz spacing to 100 GHz spacing), comb filters having a different number of glass plates and multiple layers of interleaving/deinterleaving (e.g., 50 GHz spacing to 200 GHz spacing) can also be provided.

A set of optical channels having a first spacing (e.g., 100 GHz, 50 GHz) is provided to deinterleaver 1020 via optical fiber 1010. Deinterleaver 1020 separates the set of channels into even and odd channels as described above. The odd channels are input to demultiplexer 1030 and the even channels are input to demultiplexer 1035. Demultiplexer 1030 separates the odd channels and outputs each channel on a separate fiber. Similarly, demultiplexer 1035 separates the even channels and outputs each channel on a separate fiber.

The individual channels provided by demultiplexers 1030 and 1035 are provided to various optical devices (not shown in FIG. 10). The optical devices operate on the individual channels as appropriate and output individual (possibly modified) channels. The output channels are input to multiplexers 1040 and 1045. Multiplexer 1040 receives the odd channels and outputs a multiplexed set of odd channels. Similarly, multiplexer 1045 receives the even channels and outputs a multiplexed set of even channels.

Interleaver 1050 receives the odd channels from multiplexer 1040 and the even channels from multiplexer 1045. Interleaver 1050 interleaves the odd and even channels as described above. The interleaved set of even and odd channels is output via optical fiber 1060.

Figure 11:
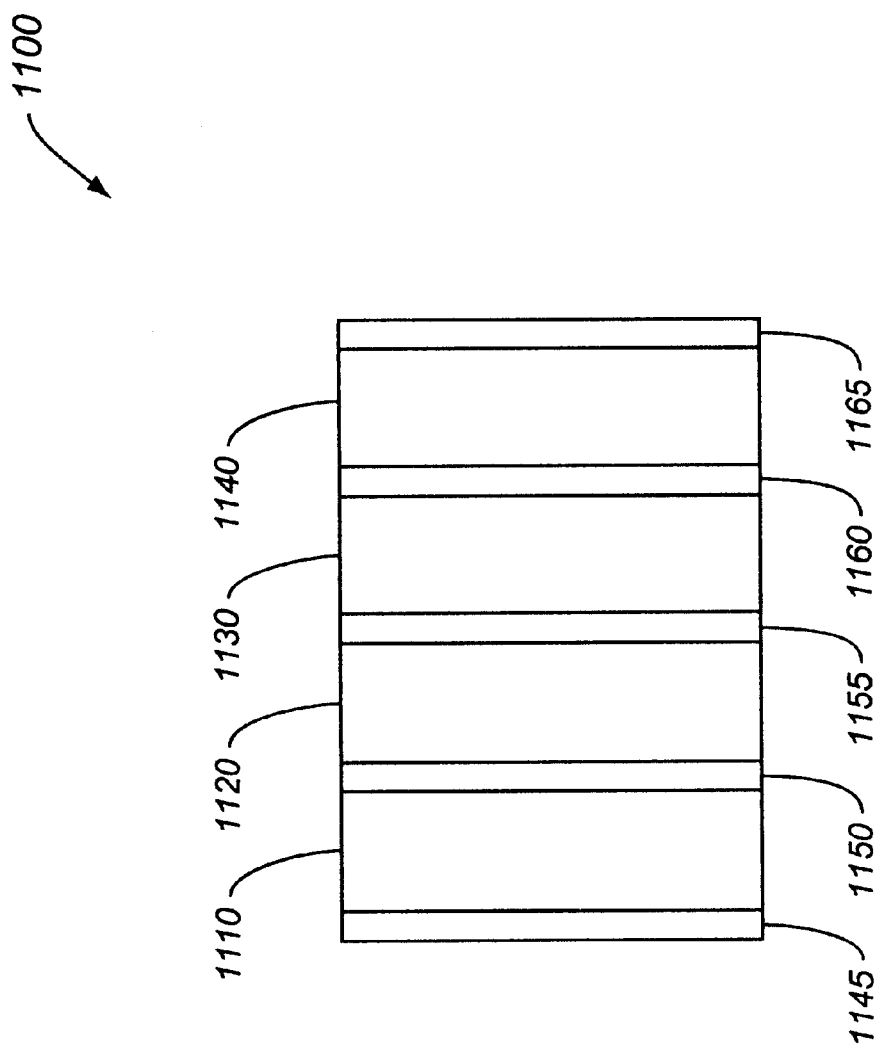
FIG. 11 illustrates one embodiment of a four-plate optical comb filter.

FIG. 11 illustrates one embodiment of a four-plate optical comb filter. The four-plate optical comb filter provides improved performance (reflectivity and transmission) as compared to a three-plate optical comb filter. As with the three-plate filter described above, the elements of filter 1100 can be assembled with or without epoxy.

In general, four-plate optical comb filter 1100 includes thin film materials 1145, 1150, 1155, 1160 and 1165 and glass plates 1110, 1120, 1130 and 1140. In one embodiment, glass plates 1110, 1120, 1130 and 1140 are 0.5 mm thick for 100 GHz spaced input signals, 1.0 mm thick for 50 GHz spaced input signals, and 0.25 mm thick for 200 GHz spaced input signals. Other plate thicknesses can be used, for example, for other input signal spacings.

In one embodiment, thin film materials 1145 and 1165 have approximately the same reflectivity that is in the range of 15% to 25% reflective (e.g., 20% reflective), thin film materials 1150 and 1160 have approximately the same reflectivity that is in the range of 55% to 65% reflective (e.g., 50% reflective) and thin film material 1155 is in the range of 65% to 75% reflective (e.g., 71% reflective). Other reflectivities and configurations can also be used.

Figure 12:
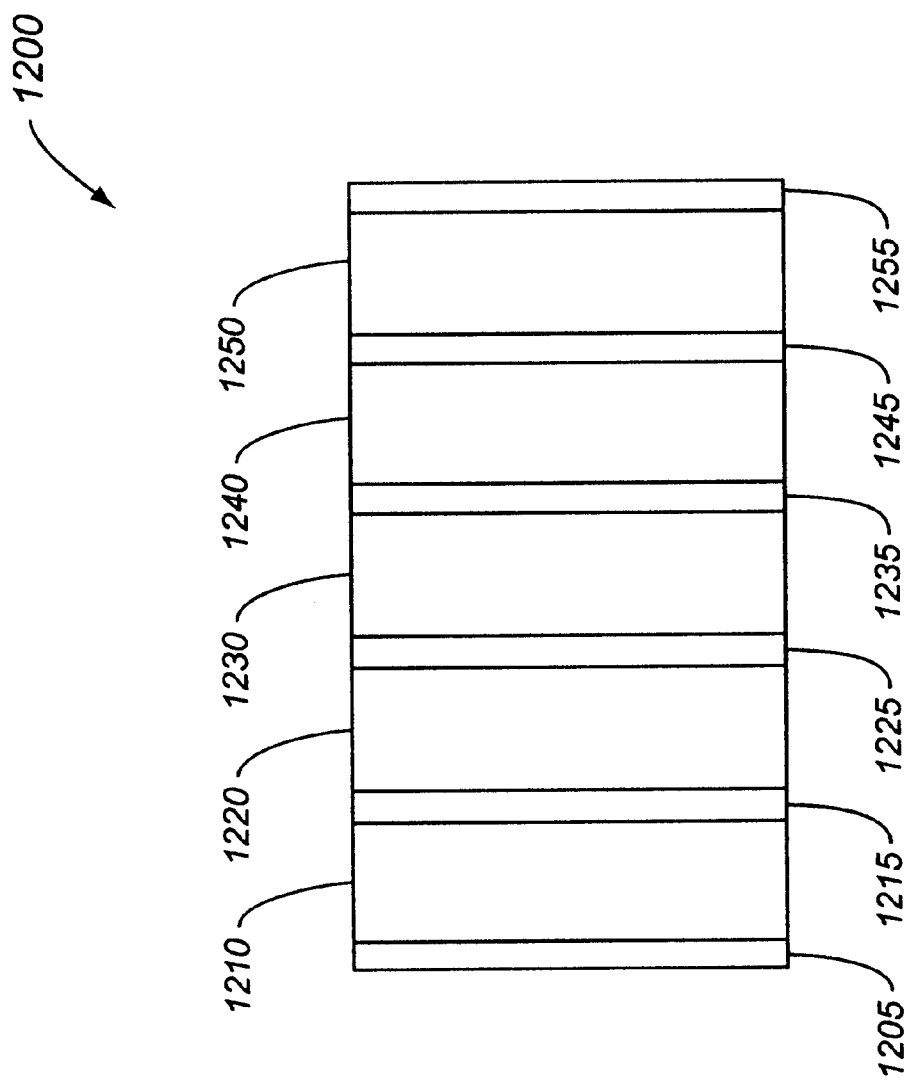
FIG. 12 illustrates one embodiment of a five-plate optical comb filter.

FIG. 12 illustrates one embodiment of a five-plate optical comb filter. The five-plate optical comb filter provides improved performance (reflectivity and transmission) as compared to a three-plate or a four-plate optical comb filter. As with the three-plate filter described above, the elements of filter 1200 can be assembled with or without epoxy.

In general, five-plate optical comb filter 1200 includes thin film materials 1205, 1215, 1225, 1235, 1245 and 1255 and glass plates 1210, 1220, 1230, 1240 and 1250. In one embodiment, glass plates 1210, 1220, 1230, 1240 and 1250 are 0.5 mm thick for 100 GHz spaced input signals, 1.0 mm thick for 50 GHz spaced input signals, and 0.25 mm thick for 200 GHz spaced input signals. Other plate thicknesses can be used, for example, for other input signal spacings.

In one embodiment, thin film materials 1205 and 1255 have approximately the same reflectivity, thin film materials 1215 and 1245 have approximately the same reflectivity, and thin film materials 1225 and 1235 have approximately the same reflectivity.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An optical comb filter comprising:
   a plurality of class plates; and
   a partially reflective material between each of the glass plates, wherein the glass plates and the partially reflective material abut one another to form a glass plate structure, partially reflective material on the front and back surfaces of the glass plate structure, wherein the partially reflective material on the front and back surfaces of the glass structure have a first reflectivity, the partially reflective material between a first glass plate and a second glass plate has a second reflectivity, the partially reflective material between the second glass plate and a third glass plate has a third reflectivity, the partially reflective material between the third glass plate and a fourth glass plate has the second reflectivity.

2. The filter of claim 1 wherein the first reflectivity is in the range of 15% to 25% reflective.

3. The filter of claim 1 wherein the second reflectivity is in the range of 55% to 65% reflective.

4. The filter of claim 1 wherein the third reflectivity is in the range of 65% to 75% reflective.

5. An optical comb filter comprising:
   a plurality of glass plates; and
   a partially reflective material between each of the glass plates, wherein the glass plates and the partially reflective material abut one another to form a glass plate structure, partially reflective material also on the front and back surfaces of the glass plate structure, wherein the partially reflective material on the front and back surfaces of the glass structure have a first reflectivity, the partially reflective material between a first glass plate and a second glass plate has a second reflectivity, the partially reflective material between the second glass plate and a third glass plate and between the third glass plate and a fourth glass plate have a third reflectivity, and the partially reflective material between the fourth glass plate and a fifth glass plate has the second reflectivity.

6. An optical filter comprising:
   a first glass plate having a coating on a first side, the coating having a first reflectivity;
   a first partially reflective material abutting a second side of the glass plate, the first partially reflective material having a second reflectivity;
   a second glass plate having a first side abutting the first partially reflective material;
   a second partially reflective material abutting a second side of the second glass plate, the second partially reflective material having a third reflectivity;
   a third glass plate having a first side abutting the second partially reflective material;
   a third partially reflective material abutting a second side of the third glass plate; the third partially reflective material having the second reflectivity;
   a fourth glass plate having a first side abutting the third partially reflective material and a second side having a partially reflective coating having the first reflectivity.

7. The filter of claim 6 wherein the first second, third, and fourth glass plates have a thickness of approximately 0.5 mm.

8. The filter of claim 6 wherein the first, second, third, and fourth glass plates have a thickness of approximately 1.0 mm.

9. The filter of claim 6 wherein the first reflectivity is in the range of 15% to 20%.

10. The filter of claim 6 wherein the second reflectivity is in the range of 55% to 65% reflective.

11. The filter of claim 6 wherein the third reflectivity is in the range of 65% to 75% reflective.

12. An optical deinterleaver comprising:
   a first multi-plate optical comb filter optically coupled to receive a set of optical signals, the first multi-plate optical comb filter to pass a first subset of the optical signals and to reflect a second subset of the optical signals; and
   a second multi-plate optical comb filter optically coupled to receive the second subset of the optical signals, the second multi-plate optical comb filter to pass the second subset of the optical signals and to reflect the first subset of the optical signals, wherein at least one of the first and the second multi-plate optical comb filters comprises:
      a first glass plate having a coating on a first side, the coating having a first reflectivity;
      a first partially reflective material abutting a second side of the first glass plate, the first partially reflective material having a second reflectivity;
      a second glass plate having a first side abutting the first partially reflective material;
      a second partially reflective material abutting a second side of the second glass plate, the second partially reflective material having a third reflectivity;
      a third glass plate having a first side abutting the second partially reflective material;
      a third partially reflective material abutting a second side of the third glass plate, the third partially reflective material having the second reflectivity; and
      a fourth glass plate having a first side abutting the third partially reflective material and a second side having a partially reflective coating having the first reflectivity.

13. An optical interleaver comprising a multi-plate optical comb filter optically to pass a first subset of optical signals and to reflect a second subset of optical signals, the multi-plate optical comb filter to receive the first subset of optical signals on a first face and the second subset of optical signals on a second face and to output a set of optical signals comprising the first subset of optical signals and the second subset of optical signals, wherein the multi-plate optical comb filter comprises:
   a first glass plate having a coating on a first side, the coating having a first reflectivity;
   a first partially reflective material abutting a second side of the first glass plate, the first partially reflective material having a second reflectivity;
   a second glass plate having a first side abutting the first partially reflective material;
   a second partially reflective material abutting a second side of the second glass plate, the second partially reflective material having a third reflectivity;
   a third glass plate having a first side abutting the second partially reflective material;
   a third partially reflective material abutting a second side of the third glass plate, the third partially reflective material having the second reflectivity; and
   a fourth glass plate having a first side abutting the third partially reflective material and a second side having a partially reflective coating having the first reflectivity.

\* \* \* \* \*